US008069955B2

(12) United States Patent
Aulanko et al.

(10) Patent No.: US 8,069,955 B2
(45) Date of Patent: Dec. 6, 2011

(54) ELEVATOR AND TRACTION SHEAVE OF AN ELEVATOR

(75) Inventors: Esko Aulanko, Kerava (FI); Jorma Mustalahti, Hyvinkaa (FI); Pekka Rantanen, Hyvinkaa (FI); Simo Makimattila, Espoo (FI)

(73) Assignee: Kone Corporation, Helsinki (FI)

( * ) Notice: Subject to any disclaimer, the term of this patent is extended or adjusted under 35 U.S.C. 154(b) by 273 days.

(21) Appl. No.: 10/419,892

(22) Filed: Apr. 22, 2003

(65) Prior Publication Data

US 2003/0192743 A1 Oct. 16, 2003

Related U.S. Application Data

(63) Continuation of application No. PCT/FI01/01072, filed on Dec. 7, 2001.

(30) Foreign Application Priority Data

Dec. 8, 2000 (FI) .................................... 20002701

(51) Int. Cl.
*B66B 11/08* (2006.01)
*B66B 7/00* (2006.01)
*B66D 3/04* (2006.01)
*F16H 27/02* (2006.01)

(52) U.S. Cl. ........ 187/254; 187/266; 187/414; 254/390; 74/89.22

(58) Field of Classification Search .................. 187/251, 187/254, 264, 266, 255, 414; 254/390, 393, 254/902, 391; 474/166, 168, 177, 178, 17, 474/90; 74/89.22
See application file for complete search history.

(56) References Cited

U.S. PATENT DOCUMENTS 2,017,149 A 10/1935 Greening
3,010,700 A * 11/1961 Petersen .............. 254/134.3 PA
3,279,762 A 10/1966 Bruns
(Continued)

FOREIGN PATENT DOCUMENTS

DE 3626045 A1 * 2/1988 .................... 187/251
(Continued)

OTHER PUBLICATIONS

CALCE and the University of Maryland, Material Hardness, 2001, pp. 8-10.*

(Continued)

*Primary Examiner* — Michael Mansen
*Assistant Examiner* — Stefan Kruer
(74) *Attorney, Agent, or Firm* — Harness, Dickey & Pierce, P.L.C.

(57) ABSTRACT

An elevator may include an elevator car, a counterweight, a set of hoisting ropes, and one or more rope pulleys. The car and counterweight may be suspended on the hoisting ropes. At least one rope pulley may include a solid surface including a plurality of rope grooves configured to receive at least one hoisting rope. Each rope groove may generally conform to a semi-circular shape and may include a groove bottom and sides. The at least one rope pulley may include a coating adhesively bonded to it. The coating may directly contact the at least one hoisting rope. A coating thickness may be less than or equal to about 3 mm. At the groove bottom of each rope groove, the coating thickness may be substantially less than half a thickness of the at least one hoisting rope. The coating may cover the groove bottom and sides of each rope groove.

18 Claims, 3 Drawing Sheets

U.S. PATENT DOCUMENTS

| | | | | |
|---|---|---|---|---|
| 3,332,665 | A | 7/1967 | Bruns | |
| 3,934,482 | A * | 1/1976 | Byers | 474/9 |
| 3,946,618 | A * | 3/1976 | Green | 242/155 BW |
| 4,013,142 | A * | 3/1977 | Hagg | 187/254 |
| 4,030,569 | A | 6/1977 | Berkovitz | |
| 4,198,196 | A | 4/1980 | Cilderman et al. | |
| 4,402,488 | A | 9/1983 | Berkovitz | |
| 4,422,286 | A * | 12/1983 | Simpson et al. | 57/221 |
| 4,441,692 | A * | 4/1984 | Kovaleski | 254/390 |
| 4,465,161 | A | 8/1984 | Ohta et al. | |
| 4,756,388 | A * | 7/1988 | Heikkinen | 187/266 |
| 4,807,723 | A * | 2/1989 | Salmon et al. | 187/266 |
| 5,112,933 | A * | 5/1992 | O'Donnell et al. | 254/393 |
| 5,429,211 | A * | 7/1995 | Aulanko et al. | 187/254 |
| 5,792,294 | A * | 8/1998 | Randazzo et al. | 187/254 |
| 5,881,843 | A * | 3/1999 | O'Donnell et al. | 187/254 |
| 6,027,103 | A * | 2/2000 | Painter | 254/332 |
| 6,068,241 | A * | 5/2000 | Meyer | 254/390 |
| 6,364,061 | B2 * | 4/2002 | Baranda et al. | 187/254 |
| 6,371,448 | B1 | 4/2002 | De Angelis | |
| 6,386,324 | B1 * | 5/2002 | Baranda et al. | 187/254 |
| 6,419,208 | B1 * | 7/2002 | Baranda et al. | 254/390 |
| 6,538,075 | B1 * | 3/2003 | Krech et al. | 525/458 |
| 7,137,483 | B2 | 11/2006 | Kato et al. | |
| 2003/0089551 | A1 * | 5/2003 | Kato et al. | 182/1 |
| 2003/0183458 | A1 * | 10/2003 | Mustalahti et al. | 187/254 |
| 2003/0192743 | A1 * | 10/2003 | Aulanko et al. | 187/254 |
| 2004/0016602 | A1 * | 1/2004 | Aulanko et al. | 187/254 |
| 2004/0026676 | A1 * | 2/2004 | Smith et al. | 254/393 |
| 2004/0129501 | A1 * | 7/2004 | Wittur et al. | 187/254 |
| 2004/0256181 | A1 * | 12/2004 | Durand et al. | 187/316 |
| 2005/0006180 | A1 * | 1/2005 | Mustalahti et al. | 187/254 |
| 2005/0126859 | A1 * | 6/2005 | Aulanko et al. | 187/264 |
| 2005/0236232 | A1 * | 10/2005 | Mustalahti et al. | 187/250 |
| 2006/0070822 | A1 | 4/2006 | Osada et al. | |

FOREIGN PATENT DOCUMENTS

| | | | | |
|---|---|---|---|---|
| EP | 185531 | A1 * | 6/1986 | |
| EP | 0194948 | | 9/1986 | |
| GB | 2127934 | A * | 4/1984 | |
| JP | 36-16764 | | 9/1961 | |
| JP | 54-104145 | A * | 8/1979 | 187/254 |
| JP | 5589181 | | 7/1980 | |
| JP | 54-043019 | | 3/1981 | |
| JP | 54-093474 | | 7/1981 | |
| JP | 56-149976 | | 11/1981 | |
| JP | 56-149978 | | 11/1981 | |
| JP | 57114061 | A * | 7/1982 | |
| JP | 57-137285 | | 8/1982 | |
| JP | 57-203681 | | 12/1982 | |
| JP | 58-42586 | | 3/1983 | |
| JP | 58-88262 | | 5/1983 | |
| JP | 59-4588 | | 1/1984 | |
| JP | 59-153793 | | 9/1984 | |
| JP | 59-164450 | | 9/1984 | |
| JP | 62-60356 | | 12/1987 | |
| JP | 64-7955 | | 2/1989 | |
| JP | 1-21075 | | 4/1989 | |
| JP | 3-20624 | | 3/1991 | |
| JP | 5-146968 | | 6/1993 | |
| JP | 2840491 | | 10/1998 | |
| SU | 1641759 | A * | 4/1991 | 187/251 |
| WO | WO 0059819 | A2 * | 10/2000 | |

OTHER PUBLICATIONS

Office Action for corresponding Japanese Application No. 2002-547831 dated Jul. 24, 2007.

Office Action for corresponding Japanese Application No. 2002-547831 dated Nov. 16, 2006.

Office Action for corresponding Japanese Application No. 2002-547831 dated Mar. 3, 2008.

http://www.astm.org/Standards/D2240.htm pp. 1-4 (Mar. 23, 2009).

Office Action for U.S. Appl. No. 11/976,131, mailed on Dec. 17, 2008.

Office Action for U.S. Appl. No. 11/976,131, mailed on Apr. 10, 2009.

CALCE @ UMD, Material Hardness, pp. 1-21 (2001).

Office Action for U.S. Appl. No. 11/976,131, mailed on Jul. 28, 2009.

Office Action for U.S. Appl. No. 11/976,131, mailed on Mar. 22, 2010.

U.S. Office Action for U.S. Appl. No. 11/976,131 dated Jan. 13, 2001.

Office Action dated Jan. 5, 2010, issued in corresponding Japanese Application No. 2002-547831 and English translation thereof.

U.S. Office Action for U.S. Appl. No. 11/976,131 dated Aug. 4, 2010.

* cited by examiner

ELEVATOR AND TRACTION SHEAVE OF AN ELEVATOR

CROSS-REFERENCE TO RELATED APPLICATIONS

This application is a continuation application under 37 C.F.R. §1.53(b) of PCT International Application No. PCT/FI01/01072 filed on Dec. 7, 2001, which claims the benefit under 35 U.S.C. §119(a) of Finnish Patent Application 20002701 filed Dec. 8, 2000, the entire contents of each of which are hereby incorporated by reference.

BACKGROUND

1. Field

The present invention relates to an elevator, as discussed below, and to an elevator traction sheave, as also discussed below.

2. Description of Related Art

The operation of a conventional traction sheave elevator is based on a solution in which steel wire ropes serving as hoisting ropes and also as suspension ropes are moved by means of a metallic traction sheave, often made of cast iron, driven by an elevator drive machine. The motion of the hoisting ropes produces a motion of a counterweight and elevator car suspended on them. The tractive force from the traction sheave to the hoisting ropes, as well as the braking force applied by means of the traction sheave, is transmitted by the agency of the friction between the traction sheave and the ropes.

The coefficient of friction between the steel wire ropes and the metallic traction sheaves used in elevators is often insufficient in itself to maintain the required grip between the traction sheave and the hoisting rope in normal situations during elevator operation. The friction and the forces transmitted by the rope are increased by modifying the shape of the rope grooves on the traction sheave. The traction sheaves are provided with undercut or V-shaped rope grooves, which create a strain on the hoisting ropes and therefore also cause more wear of the hoisting ropes than rope grooves of an advantageous semi-circular cross-sectional form as used e.g. in diverting pulleys. The force transmitted by the rope can also be increased by increasing the angle of bite between the traction sheave and the ropes, e.g. by using a so-called “double wrap” arrangement.

In the case of a steel wire rope and a cast-iron or cast-steel traction sheave, a lubricant is almost always used in the rope to reduce rope wear. A lubricant especially reduces the internal rope wear resulting from the interaction between rope strands. External wear of the rope consists of the wear of surface wires mainly caused by the traction sheave. The effect of the lubricant is also significant in the contact between the rope surface and the traction sheave.

To provide a substitute for the rope groove shape that causes rope wear, inserts placed in the rope groove to achieve a greater friction coefficient have been used. Such prior-art inserts are disclosed e.g. in specifications U.S. Pat. No. 3,279,762 and U.S. Pat. No. 4,198,196. The inserts described in these specifications are relatively thick. The rope grooves of the inserts are provided with a transverse or nearly transverse corrugation creating additional elasticity in the surface portion of the insert and in a way softening its surface. The inserts undergo wear caused by the forces imposed on them by the ropes, so they have to be replaced at intervals. Wear of the inserts occurs in the rope grooves, at the interface between insert and traction sheave and internally.

SUMMARY

It is an object of the invention to achieve an elevator in which the traction sheave has an excellent grip on a steel wire rope and in which the traction sheave is durable and of a design that reduces rope wear. Another object of the invention is to eliminate or avoid the above-mentioned disadvantages of prior-art solutions and to achieve a traction sheave that provides an excellent grip on the rope and is durable and reduces rope wear. A specific object of the invention is to disclose a new type of engagement between the traction sheave and the rope in an elevator. It is also an object of the invention to apply said engagement between the traction sheave and the rope to possible diverting pulleys of the elevator.

As for the features characteristic of the invention, reference is made to the claims.

In an elevator provided with hoisting ropes of substantially round cross-section, the direction of deflection of the hoisting ropes can be freely changed by means of a rope pulley. Thus, the basic layout of the elevator, i.e. the disposition of the car, counterweight and hoisting machine can be varied relatively freely. Steel wire ropes or ropes provided with a load-bearing part twisted from steel wires constitute a tried way of composing a set of hoisting ropes for suspending the elevator car and counterweight. An elevator driven by means of a traction sheave may comprise other diverting pulleys besides the traction sheave. Diverting pulleys are used for two different purposes: diverting pulleys are used to establish a desired suspension ratio of the elevator car and/or counterweight, and diverting pulleys are used to guide the passage of the ropes. Each diverting pulley may be mainly used for one of these purposes, or it may have a definite function both regarding the suspension ratio and as a means of guiding the ropes. The traction sheave driven by the drive machine additionally moves the set of hoisting ropes. The traction sheave and other eventual diverting pulleys are provided with rope grooves, each rope in the set of hoisting ropes being thus guided separately.

When a rope pulley has against a steel wire rope a coating containing rope grooves and giving great friction, a practically non-slip contact between rope pulley and rope is achieved. This is advantageous especially in the case of a rope pulley used as a traction sheave. If the coating is relatively thin, the force difference arising from the differences between the rope forces acting on different sides of the rope pulley will not produce a large tangential displacement of the surface that would lead to a large extension or compression in the direction of the tractive force when the rope is coming onto the pulley or leaving it. The greatest difference across the pulley occurs at the traction sheave, which is due to the usual difference of weight between the counterweight and the elevator car and to the fact that the traction sheave is not a freely rotating pulley but produces, at least during acceleration and braking, a factor either adding to or detracting from the rope forces resulting from the balance difference, depending on the direction of the balance difference and that of the elevator motion. A thin coating is also advantageous in that, as it is squeezed between the rope and the traction sheave, the coating can not be compressed so much that the compression would tend to evolve to the sides of the rope groove. As such compression causes lateral spreading of the material, the coating might be damaged by the great tensions produced in it. However, the coating must have a thickness sufficient to receive the rope elongations resulting from tension so that no rope slip fraying the coating occurs. At the same time, the coating has to be soft enough to allow the structural roughness of the rope, in other words, the surface wires to sink at least partially into the coating, yet hard enough to ensure that the coating will not substantially escape from under the roughness of the rope.

For steel wire ropes less than 10 mm thick, in which the surface wires are of a relatively small thickness, a coating hardness ranging from below 60 shoreA up to about 100 shoreA can be used. For ropes having surface wires thinner than in conventional elevator ropes, i.e. ropes having surface wires only about 0.2 mm thick, a preferable coating hardness is in the range of about 80 . . . 90 shoreA or even harder. A relatively hard coating can be made thin. When a rope with somewhat thicker surface wires (about 0.5 . . . 1 mm) is used, a good coating hardness is in the range of about 70 . . . 85 shoreA and a thicker coating is needed. In other words, for thinner wires a harder and thinner coating is used, and for thicker wires a softer and thicker coating is used. As the coating is firmly attached to the sheave by an adhesive bond comprising the entire area resting against the sheave, there will occur between the coating and the sheave no slippage causing wear of these. An adhesive bond may be made e.g. by vulcanizing a rubber coating onto the surface of a metallic rope sheave or by casting polyurethane or similar coating material onto a rope sheave with or without an adhesive or by applying a coating material on the rope sheave or gluing a coating element fast onto the rope sheave.

Thus, on the one hand, due to the total load or average surface pressure imposed on the coating by the rope, the coating should be hard and thin, and on the other hand, the coating should be sufficiently soft and thick to permit the rough surface structure of the rope to sink into the coating to a suitable degree to produce sufficient friction between the rope and the coating and to ensure that the rough surface structure will not pierce the coating.

A highly advantageous embodiment of the invention is the use of a coating on the traction sheave. Thus, a preferred solution is to produce an elevator in which at least the traction sheave is provided with a coating. A coating is also advantageously used on the diverting pulleys of the elevator. The coating functions as a damping layer between the metallic rope pulley and the hoisting ropes.

The coating of the traction sheave and that of a rope pulley may be differently rated so that the coating on the traction sheave is designed to accommodate a larger force difference across the sheave. The properties to be rated are thickness and material properties of the coating. Preferable coating materials are rubber and polyurethane. The coating is required to be elastic and durable, so it is possible to use other durable and elastic materials as far as they can be made strong enough to bear the surface pressure produced by the rope. The coating may be provided with reinforcements, e.g. carbon fiber or ceramic or metallic fillers, to improve its capacity to withstand internal tensions and/or the wearing or other properties of the coating surface facing the rope.

The invention provides the following advantages, among other things:

- great friction between traction sheave and hoisting rope
- the coating reduces abrasive wear of the ropes, which means that less wear allowance is needed in the surface wires of the rope, so the ropes can be made entirely of thin wires of strong material
- since the ropes can be made of thin wires, and since thin wires can be made relatively stronger, the hoisting ropes may be correspondingly thinner, smaller rope pulleys can be used, which again allows a space saving and more economical layout solutions
- the coating is durable because in a relatively thin coating no major internal expansion occurs
- in a thin coating, deformations are small and therefore also the dissipation resulting from deformations and producing heat internally in the coating is low and heat is easily removed from the thin coating, so the thermal strain produced in the coating by the load is small
- as the rope is thin and the coating on the rope pulley is thin and hard, the rope pulley rolls lightly against the rope
- no wear of the coating occurs at the interface between the metallic part of the traction sheave and the coating material
- the great friction between the traction sheave and the hoisting rope allows the elevator car and counterweight to be made relatively light, which means a cost saving.

BRIEF DESCRIPTION OF THE DRAWINGS

In the following, the invention will be described in detail with reference to the attached drawings, wherein.

DETAILED DESCRIPTION OF EXAMPLE EMBODIMENTS

Figure 1:
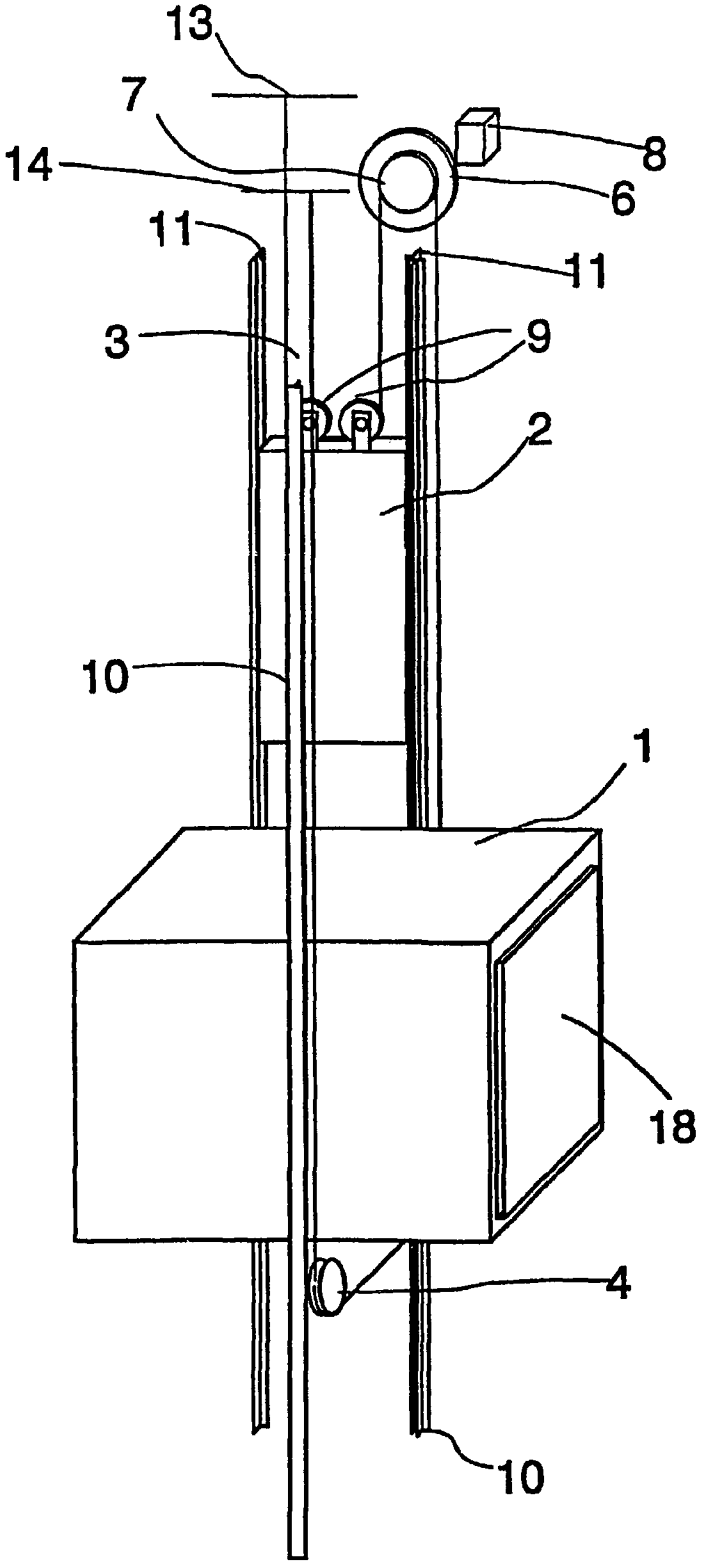
FIG. 1 presents a diagram representing an elevator according to the invention.

FIG. 1 is a diagrammatic representation of the structure of an elevator. The elevator is preferably an elevator without machine room, in which the drive machine 6 is placed in the elevator shaft, although the invention is also applicable for use in elevators with machine room. The passage of the hoisting ropes 3 of the elevator is as follows: One end of the ropes is immovably fixed to an anchorage 13 located in the upper part of the shaft above the path of a counterweight 2 moving along counterweight guide rails 11. From the anchorage, the ropes run downward and are passed around diverting pulleys 9 suspending the counterweight, which diverting pulleys 9 are rotatably mounted on the counterweight 2 and from which the ropes 3 run further upward to the traction sheave 7 of the drive machine 6, passing around the traction sheave along rope grooves on the sheave. From the traction sheave 7, the ropes 3 run further downward to the elevator car 1 moving along car guide rails 10, passing under the car via diverting pulleys 4 used to suspend the elevator car on the ropes, and going then upward again from the elevator car to an anchorage 14 in the upper part of the elevator shaft, to which anchorage the second end of the ropes 3 is fixed. Anchorage 13 in the upper part of the shaft, the traction sheave 7 and the diverting pulley 9 suspending the counter-weight on the ropes are preferably so disposed in relation to each other that both the rope portion going from the anchorage 13 to the counterweight 2 and the rope portion going from the counterweight 2 to the traction sheave 7 are substantially parallel to the path of the counterweight 2. Similarly, a solution is preferred in which anchorage 14 in the upper part of the shaft, the traction sheave 7 and the diverting pulleys 4 suspending the elevator car on the ropes are so disposed in relation to each other that the rope portion going from the anchorage 14 to the elevator car 1 and the rope portion going from the elevator car 1 to the traction sheave 7 are substantially parallel to the path of the elevator car 1. With this arrangement, no additional diverting pulleys are needed to define the passage of the ropes in the shaft. The rope suspension acts in a substantially centric manner on the elevator car 1, provided that the rope pulleys 4 supporting the elevator car are mounted substantially symmetrically relative to the vertical center line passing via the center of gravity of the elevator car 1.

The drive machine 6 placed in the elevator shaft is preferably of a flat construction, in other words, the machine has a small depth as compared with its width and/or height, or at least the machine is slim enough to be accommodated between the elevator car and a wall of the elevator shaft. The machine may also be placed differently. Especially a slim machine can be fairly easily fitted above the elevator car. The elevator shaft can be provided with equipment required for the supply of power to the motor driving the traction sheave 7 as well as equipment for elevator control, both of which can be placed in a common instrument panel 8 or mounted separately from each other or integrated partly or wholly with the drive machine 6. The drive machine may be of a geared or gearless type. A preferable solution is a gearless machine comprising a permanent magnet motor. The drive machine may be fixed to a wall of the elevator shaft, to the ceiling, to a guide rail or guide rails or to some other structure, such as a beam or frame. In the case of an elevator with machine below, a further possibility is to mount the machine on the bottom of the elevator shaft. FIG. 1 illustrates the economical 2:1 suspension, but the invention can also be implemented in an elevator using a 1:1 suspension ratio, in other words, in an elevator in which the hoisting ropes are connected directly to the counterweight and elevator car without diverting pulleys, or in an elevator implemented using some other suspension arrangement suited for a traction sheave elevator.

Figure 2:
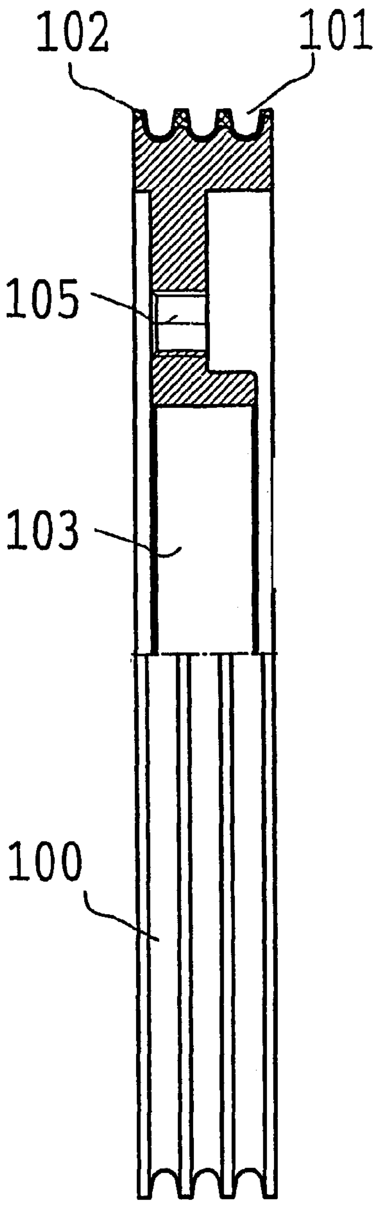
FIG. 2 presents a rope pulley applying the invention.

FIG. 2 presents a partially sectioned view of a rope pulley 100 applying the invention. The rope grooves 101 are in a coating 102 placed on the rim of the rope pulley. The rope pulley is preferably made of metal or plastic. Provided in the hub of the rope pulley is a space 103 for a bearing used to support the rope pulley. The rope pulley is also provided with holes 105 for bolts, allowing the rope pulley to be fastened by its side to an anchorage in the hoisting machine 6, e.g. to a rotating flange, to form a traction sheave 7, in which case no bearing separate from the hoisting machine is needed.

Figure 3A:
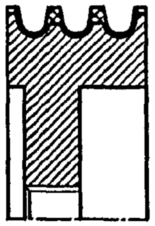
FIGS. 3*a*, 3*b*, 3*c* and 3*d* present different alternative structures of the coating of a rope pulley.
Figure 3B:
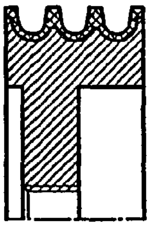
Figure 3C:
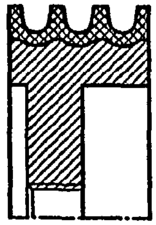
Figure 3D:
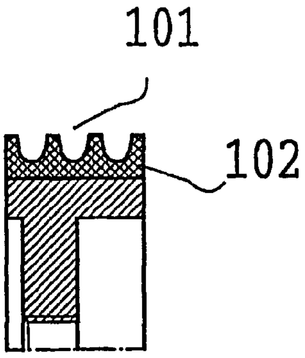

FIGS. 3*a*, 3*b*, 3*c*, 3*d* illustrate alternative ways of coating a rope pulley. An easy way in respect of manufacturing technique is to provide the smooth cylindrical outer surface of a pulley as shown in FIG. 3*d* with a coating 102 in which the rope grooves 101 are formed. However, such a grooved coating made on a smooth surface as illustrated in FIG. 3*d* can not withstand a very great compression produced by the ropes as they are pressed into the rope grooves, because the pressure can evolve laterally. In the solutions presented in FIGS. 3*a*, 3*b* and 3*c*, the shape of the rim is better adapted to the shape of the rope grooves in the coating, so the shape of the rope grooves is better supported and the load-bearing surface layer of even or nearly even thickness under the rope provides a better resistance against lateral propagation of the compression stress produced by the ropes. The lateral spreading of the coating caused by the pressure is promoted by thickness and elasticity of the coating and reduced by hardness and eventual reinforcements of the coating. Especially in the solution presented in FIG. 3*c*, in which the coating has a thickness corresponding to nearly half the rope thickness, a hard and inelastic coating is needed, whereas the coating in FIG. 3*a*, which has a thickness equal to about one tenth of the rope thickness, may be clearly softer. The thickness of the coating in FIG. 3*b* at the bottom of the groove equals about one fifth of the rope thickness. The coating thickness should equal at least 2-3 times the depth of the rope surface texture formed by the surface wires of the rope. Such a very thin coating, having a thickness even less than the thickness of the surface wire of the rope, will not necessarily endure the strain imposed on it. In practice, the coating must have a thickness larger than this minimum thickness because the coating will also have to receive rope surface variations rougher than the surface texture. Such a rougher area is formed e.g. where the level differences between rope strands are larger than those between wires. In practice, a suitable minimum coating thickness is about 1-3 times the surface wire thickness. In the case of the ropes normally used in elevators, which have been designed for a contact with a metallic rope groove and which have a thickness of 8-10 mm, this thickness definition leads to a coating at least about 1 mm thick. Since a coating on the traction sheave, which causes more rope wear than the other rope pulleys of the elevator, will reduce rope wear and therefore also the need to provide the rope with thick surface wires, the rope can be made smoother. The use of thin wires allows the rope itself to be made thinner, because thin steel wires can be manufactured from a stronger material than thicker wires. For instance, using 0.2 mm wires, a 4 mm thick elevator hoisting rope of a fairly good construction can be produced. However, the coating should be thick enough to ensure that it will not be very easily scratched away or pierced e.g. by an occasional sand grain or similar particle having got between the rope groove and the hoisting rope. Thus, a desirable minimum coating thickness, even when thin-wire hoisting ropes are used, would be about 0.5 . . . 1 mm.

Figure 4:
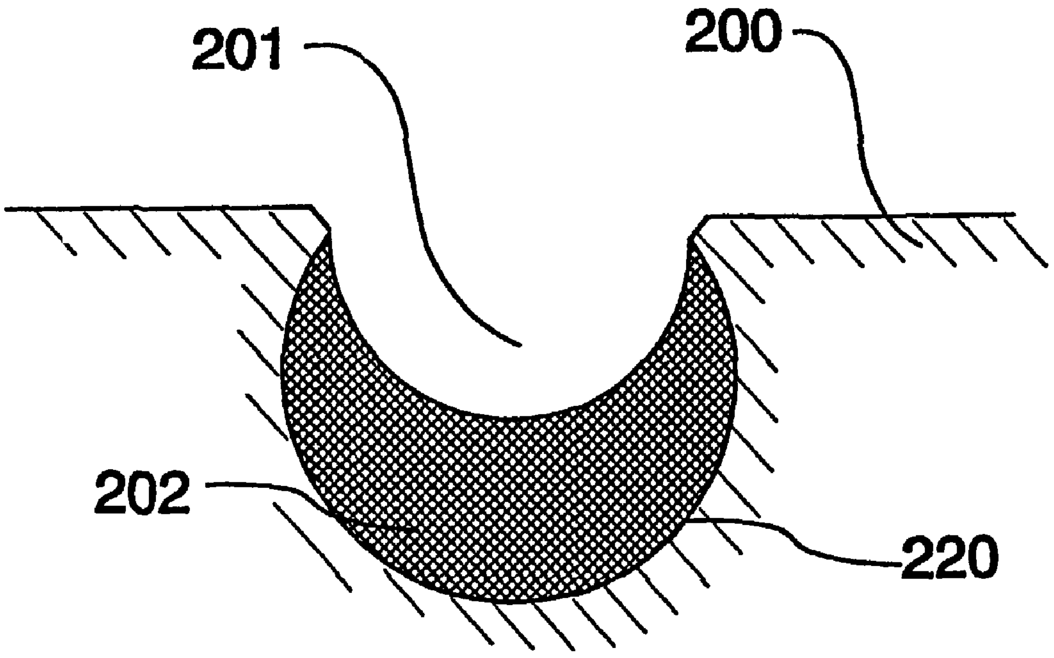
FIG. 4 presents a further coating solution.

FIG. 4 presents a solution in which the rope groove 201 is in a coating 202 which is thinner at the sides of the rope groove than at the bottom. In such a solution, the coating is placed in a basic groove 220 provided in the rope pulley 200 so that deformations produced in the coating by the pressure imposed on it by the rope will be small and mainly limited to the rope surface texture sinking into the coating. Such a solution often means in practice that the rope pulley coating consists of rope groove-specific sub-coatings separate from each other. It is naturally possible to use rope groove-specific sub-coatings in the solutions presented in FIG. 3*a*, 3*b*, 3*c* as well.

In the foregoing, the invention has been described by way of example with reference to the attached drawing while different embodiments of the invention are possible within the scope of the inventive idea defined in the claims. In the scope of the inventive idea, it is obvious that a thin rope increases the average surface pressure imposed on the rope groove if the rope tension remains unchanged. This can be easily taken into account by adapting the thickness and hardness of the coating, because a thin rope has thin surface wires, so for instance the use of a harder and/or thinner coating will not cause any problems.

The invention claimed is:

1. An elevator, comprising:

an elevator car;

a counterweight;

a set of hoisting ropes of substantially round cross-section; and a plurality of rope pulleys;

wherein the elevator car and the counterweight are suspended on the set of hoisting ropes, wherein a first end of the set of hoisting ropes is attached to a first anchorage that does not move as the elevator car moves, wherein a second end of the set of hoisting ropes is attached to a second anchorage that does not move as the elevator car moves, wherein at least one of the rope pulleys comprises a solid surface including a plurality of rope grooves configured to receive at least one hoisting rope of the set of hoisting ropes, wherein each rope groove generally conforms to a substantially circular shape and has an opening for receiving a hoisting rope, the opening having a width less than a diameter of the rope groove, wherein each rope groove includes a groove bottom and groove sides, wherein the at least one of the rope pulleys includes a coating adhesively bonded to the at least one of the rope pulleys, wherein the coating is configured to directly contact the at least one hoisting rope, wherein, at the groove bottom of each rope groove, a thickness of the coating measured in a direction perpendicular to a rotation axis of the at least one of the rope pulleys from a hoisting-rope-contacting surface of the coating to the solid surface is less than 3 mm or is equal to about 3 mm, wherein, at the groove sides of each rope groove, the thickness of the coating is less than 3 mm or is equal to about 3 mm, wherein, at the groove bottom of each rope groove, the thickness of the coating measured in the direction perpendicular to the rotation axis of the at least one of the rope pulleys from the hoisting-rope-contacting surface of the coating to the solid surface is substantially less than half the thickness of the at least one hoisting rope, wherein the coating has a crescent-shaped cross-section covering the groove bottom and the groove sides of each rope groove, and wherein a thickness of the coating covering the groove sides is less than the thickness of the coating covering the groove bottom.

2. The elevator of claim 1, further comprising:

a drive machine;

wherein one of the rope pulleys is a traction sheave adapted to be driven by the drive machine to move the set of hoisting ropes, and wherein the traction sheave includes a coating on the traction sheave.

3. The elevator of claim 2, wherein the coating on the traction sheave and a coating on at least one other rope pulley are differently rated so that the coating on the traction sheave accommodates a larger force difference across the traction sheave than a force difference across the at least one other rope pulley.

4. The elevator of claim 1, wherein all of the rope pulleys include a coating on the rope pulleys.

5. The elevator of claim 1, wherein the thickness of the coating varies in a widthwise direction of the plurality of rope grooves on the at least one of the rope pulleys.

6. The elevator of claim 1, wherein the hoisting ropes have a substantially round cross-section, and wherein the hoisting ropes include a load-bearing part twisted from steel wires.

7. The elevator of claim 1, wherein the coating has a Shore A hardness, wherein the Shore A hardness is greater than 60 or is equal to about 60, and wherein the Shore A hardness is less than 100 or is equal to about 100.

8. The elevator of claim 1, wherein the coating is arranged in and between the plurality of rope grooves.

9. The elevator of claim 1, wherein at the groove bottom of each rope groove, the thickness of the coating is less than 2 mm or is equal to about 2 mm.

10. The elevator of claim 1, wherein at the groove bottom of each rope groove, the thickness of the coating is greater than 0.5 mm or is equal to about 0.5 mm.

11. A traction sheave of an elevator, comprising:

a coating; and a solid surface including a plurality of rope grooves, wherein each of the rope grooves has an opening for receiving a hoisting rope having a substantially round cross-section, the opening having a width less than a diameter of the rope groove, wherein first and second ends of the hoisting rope are respectively attached to first and second anchorages that do not move as the traction sheave moves, wherein the coating is adhesively bonded to the traction sheave, wherein the coating covers the plurality of rope grooves, wherein the coating is configured to directly contact the at least one hoisting rope, wherein each rope groove generally conforms to a substantially circular shape, wherein each rope groove has a groove bottom and groove sides, wherein, at the groove bottom of each rope groove, a thickness of the coating measured in a direction perpendicular to a rotation axis of the traction sheave from a hoisting-rope-contacting surface of the coating to the solid surface is less than 3 mm or is equal to about 3 mm, wherein, at the groove bottom of each rope groove, the thickness of the coating measured in the direction perpendicular to the rotation axis of the traction sheave from the hoisting-rope-contacting surface of the coating to the solid surface is substantially less than half the thickness of the at least one hoisting rope, wherein, the coating has a crescent-shaped cross-section covering the groove bottom and the groove sides of each rope groove, and wherein, a thickness of the coating covering the groove sides is less than the thickness of the coating covering the groove bottom.

12. The traction sheave of claim 11, wherein the coating is made of rubber, polyurethane, or another elastic material.

13. The traction sheave of claim 11, wherein the coating has a Shore A hardness, wherein the Shore A hardness is greater than 60 or is equal to about 60, and wherein the Shore A hardness is less than 100 or is equal to about 100.

14. The traction sheave of claim 11, wherein at the groove bottom of each rope groove, the thickness of the coating is less than 2 mm or is equal to about 2 mm.

15. A coating for at least one rope pulley that is configured to receive at least one hoisting rope of a set of hoisting ropes of an elevator, each of the hoisting ropes having a substantially round cross-section, and the set of hoisting ropes supporting an elevator car and a counterweight of the elevator, wherein first and second ends of the set of hoisting ropes are respectively attached to first and second anchorages that do not move as the elevator car moves, the at least one rope pulley including a solid surface having a plurality of rope grooves, each rope groove generally conforming to a substantially circular shape and having an opening for receiving a hoisting rope among the set of hoisting ropes, the opening having a width less than a diameter of the rope groove, and each rope groove having a groove bottom and groove sides, wherein the coating is adhesively bonded to the at least one rope pulley, wherein the coating is configured to directly contact the at least one hoisting rope, wherein the coating covers the plurality of rope grooves, wherein, at the groove bottom of each rope groove, a thickness of the coating measured in a direction perpendicular to a rotation axis of the at least one rope pulley from a hoisting-rope-contacting surface of the coating to the solid surface is less than 3 mm or is equal to about 3 mm, wherein, at the groove bottom of each rope groove, the thickness of the coating measured in the direction perpendicular to the rotation axis of the at least one rope pulley from the hoisting-rope-contacting surface of the coating to the solid surface is substantially less than half the thickness of the at least one hoisting rope, wherein, the coating has a crescent-shaped cross-section covering the groove bottom and the groove sides of each rope groove, and wherein, a thickness of the coating covering the groove sides is less than the thickness of the coating covering the groove bottom.

16. The coating of claim 15, wherein the coating has a Shore A hardness, wherein the Shore A hardness is greater than 60 or is equal to about 60, and wherein the Shore A hardness is less than 100 or is equal to about 100.

17. The coating of claim 15, wherein the at least one rope pulley is a traction sheave adapted to be driven by a drive machine of the elevator to move the plurality of hoisting ropes.

18. The coating of claim 15, wherein at the groove bottom of each rope groove, the thickness of the coating is less than 2 mm or is equal to about 2 mm.

* * * * *